Feb. 23, 1943.　　　P. TROMBETTA　　　2,311,890
ELECTROMAGNETICALLY OPERATED SYSTEM
Filed Aug. 19, 1940　　　5 Sheets-Sheet 1

Panfilo Trombetta
INVENTOR.
BY
ATTORNEY.

Feb. 23, 1943. P. TROMBETTA 2,311,890
ELECTROMAGNETICALLY OPERATED SYSTEM
Filed Aug. 19, 1940 5 Sheets-Sheet 2

Panfilo Trombetta
INVENTOR.
BY
ATTORNEY.

Feb. 23, 1943. P. TROMBETTA 2,311,890
ELECTROMAGNETICALLY OPERATED SYSTEM
Filed Aug. 19, 1940 5 Sheets-Sheet 3
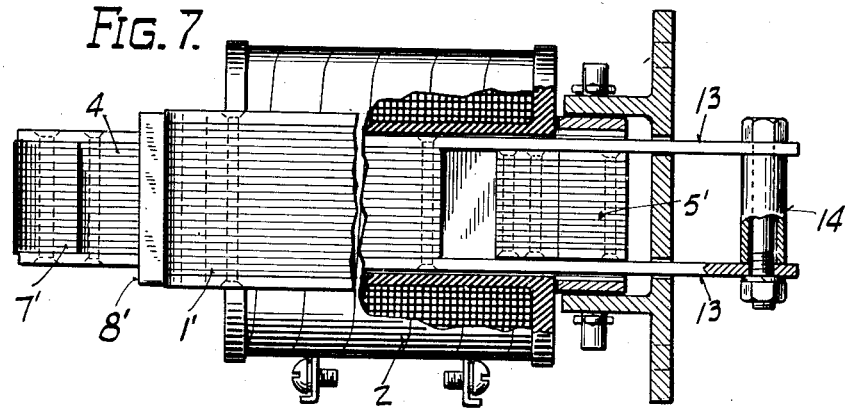
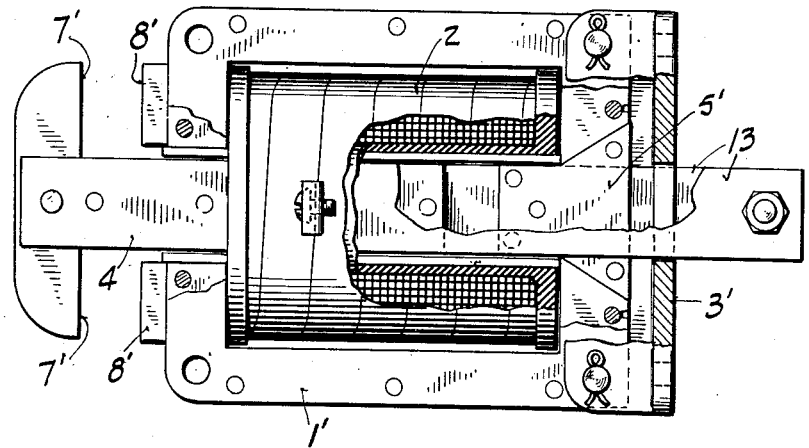
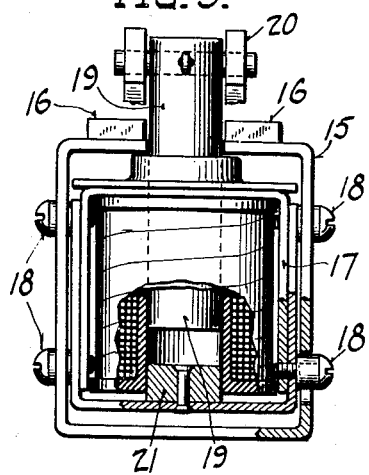 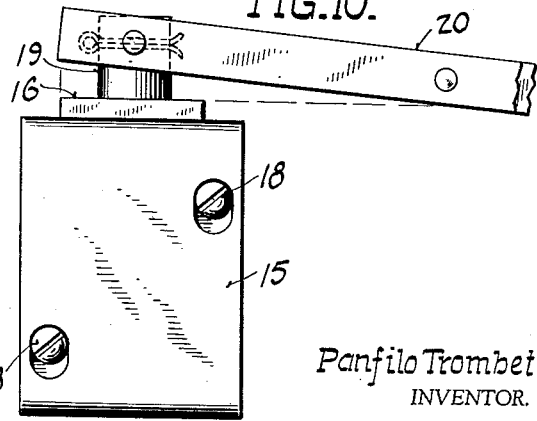
Panfilo Trombetta
INVENTOR.
BY Elwin A. Andrus
ATTORNEY.

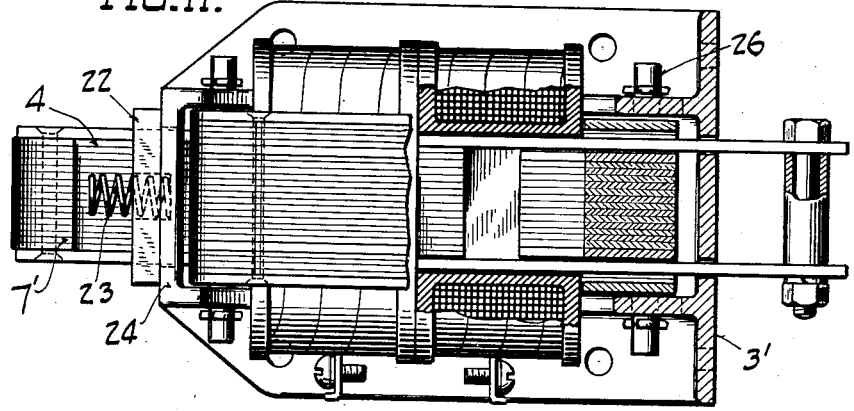
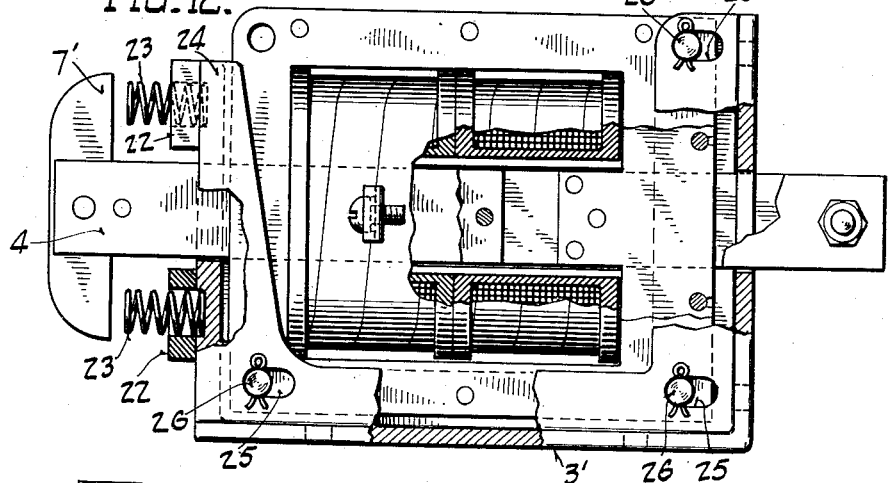
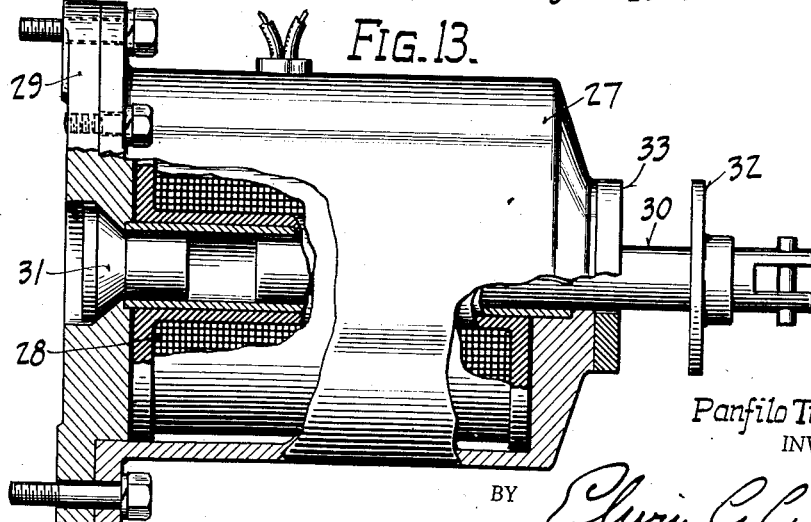

Feb. 23, 1943.  P. TROMBETTA  2,311,890
ELECTROMAGNETICALLY OPERATED SYSTEM
Filed Aug. 19, 1940  5 Sheets-Sheet 5
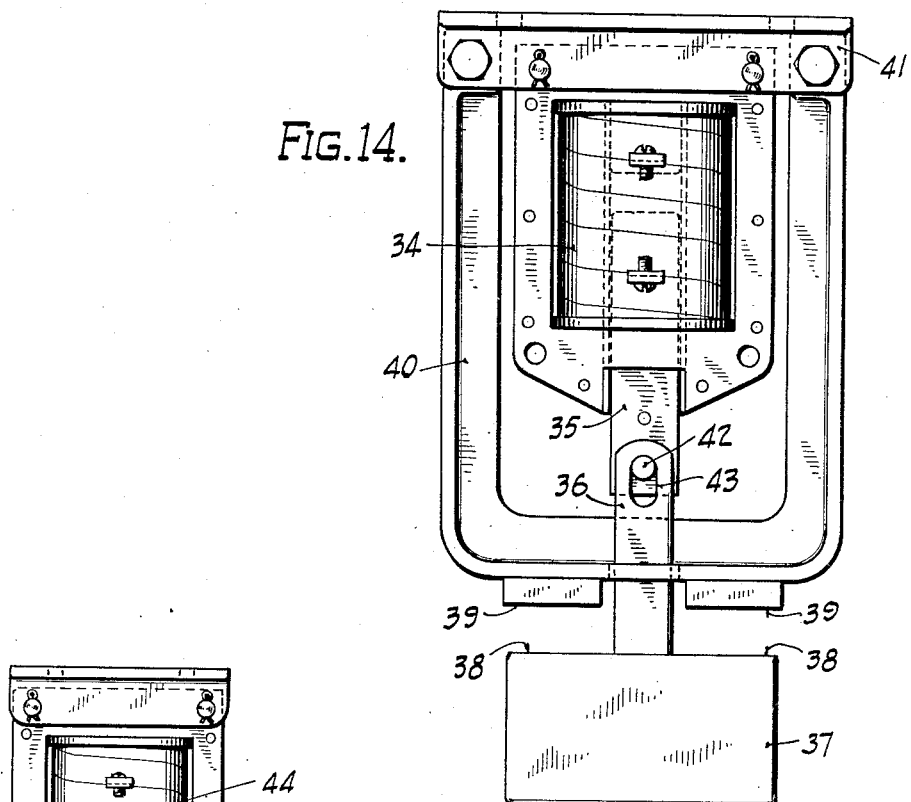
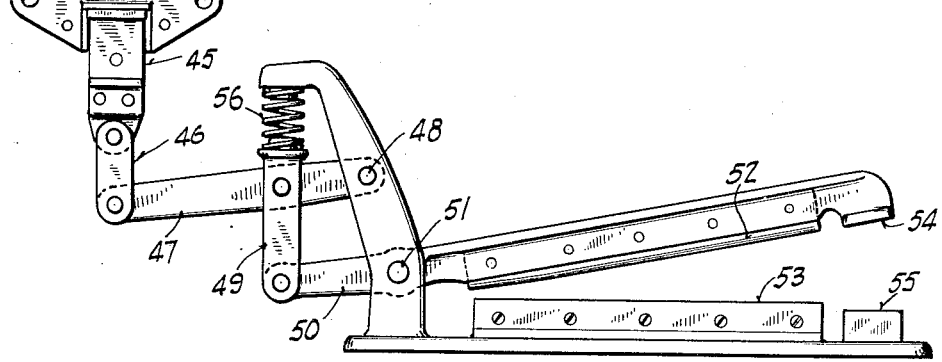
Panfilo Trombetta
INVENTOR.
BY
ATTORNEY.

Patented Feb. 23, 1943

2,311,890

UNITED STATES PATENT OFFICE 2,311,890

ELECTROMAGNETICALLY OPERATED SYSTEM

Panfilo Trombetta, Milwaukee, Wis.

Application August 19, 1940, Serial No. 353,196

2 Claims. (Cl. 175—341)

This invention relates to electromagnetically operated systems and this application constitutes a continuation in part of applicant's co-pending application Serial No. 738,571, filed August 6, 1934 for Electromagnetic apparatus.

The electromagnetically operated systems are of the solenoid or reciprocating armature type in which the moving armature functions between two forces applied thereto, one being the load and the other the magnetic force generated by an electric current flowing through a coil or coils surrounding or arranged adjacent to the armature. The load may be defined as the force which must be overcome by the magnetic force in order for the armature to do its useful work and to complete its working stroke.

In most commercial installations of solenoids the armature is made to move rapidly between extremes of position. In such installations the armature is normally open (providing an open or broken magnetic circuit) and is adapted to be moved to closed position and to be held against the load while the energizing circuit is applied to the solenoid. Stopping of the energizing current allows the load to return the armature to normal position.

Where a sensitive control is desired the solenoid is designed for very high speed movement of the armature. The speeds of operation may reach as high as five hundred (500) cycles of operation per minute and may be as low as one operation per day. In considering the design of a solenoid for any given speed of operation the mass of the armature and of all parts moving therewith must be taken into account. The inertia of this mass constitutes a part of the working load against which the magnetic force must operate to move the armature. Other parts of the working load normally consist of springs and friction. Furthermore, in considering the design of a solenoid the electromagnetic parts are designed to supply sufficient force throughout the working stroke of the armature to exceed at all times the force of the load. The specifications for most solenoids require a factor of safety to insure that this be done at 85% of the normal voltage for which the solenoid is designed, and also at 110% of such normal voltage.

In case of very rapid operations, in order that the solenoid may perform the first and second half of the cycle of movement in time to allow sufficient time between the half cycles for the controlled machine to perform its required work, the force required for acceleration is very high, reaching values in some cases as high as three hundred per cent of the force required at slower speeds of operation. As a result a high speed solenoid working under conditions of 110% of normal voltage supply is likely to have a force which is 500% of the minimum force required at normal frequency of operation and at 85% of normal voltage.

In the commercial manufacture of solenoids it is not practical to design a special solenoid for each different use, since the small volume of production would make the price prohibitive. Consequently, only a reasonable number of standard sizes of solenoids are available. Where, for instance, a fourteen pound solenoid and a twenty pound solenoid are standard, and a fifteen pound solenoid would be required for a given load, it is necessary to employ a twenty pound solenoid for the work. This gives a large excess of force tending to greatly damage the solenoid and the equipment which it controls.

All of the conditions above outlined result in a large amount of kinetic energy being built up in the armature and its attached parts during the working stroke, i. e., the movement from normally open position to closed position. The kinetic energy is the energy contained in the mass of the moving system, including the armature and all the mechanisms moving with it just prior to stopping. It is the energy of motion and is proportional to the mass of the moving system multiplied by the square of the velocity at which the system is moving at the end of its working stroke. This energy is present in the mass by reason of its motion and usually is not used up by the performance of useful work, particularly where the solenoid is of the holding type with a substantially closed magnetic circuit at the holding position.

Heretofore, in solenoid construction and application this kinetic energy was generally dissipated by the armature (which usually constituted a moving core extending centrally of the magnet coil) hitting a fixed pole piece to close the magnetic circuit. The area of the end of the armature and of the pole piece is relatively small. In an alternating current solenoid the armature and pole piece are made up of many laminations of soft iron riveted together by rivets which as a rule cannot be located where they would be most effective in producing mechanical strength. Under repeated operations and the above mentioned adverse conditions, the ends of the armature and pole piece become upset more and more until the armature sticks in its guideway in the coil. Sticking of the armature or its failure to stay closed when required generally results in the burning of the coil and in severe damage to the mechanism being operated or controlled.

The same difficulties arise in the case of direct current solenoids since the armature core is even smaller for a given size solenoid and is subject to the same wear.

In some instances attempts have been made heretofore to lessen the impact of the armature upon the pole piece by providing limited receding movement of the latter. However, in practically all such attempts the meeting surfaces of the armature and pole piece had to transmit the entire kinetic energy of the moving system to the fixed base or support, the transmission being split into two separate impacts, one when the armature struck the pole piece and the other when the pole piece struck its backing member at the limit of the recession of the pole piece.

In many instances the kinetic energy causing the trouble is principally developed in the parts which are operated by the armature as distinguished from the armature itself. This causes additional wear on the various clevis and pivot joints of the system from the impact of the armature against the frame or pole piece. The entire system is shocked by the impact and where delicate parts are being controlled the injury to them is often greater than the damage to the solenoid.

The principal object of the present invention is to provide an electromagnetically operated system which will continue to operate for an indefinite period of time without being affected by the destructive shocks produced by the sudden stopping of the solenoid plunger at the end of its working stroke, and furthermore, without in any way reducing the efficiency of the system and without reducing the factor of safety for which the system is designed.

A more specific object of the invention is to provide means to protect the armature and pole piece from damage from the kinetic energy developed in the system during operation.

Another object of the invention is to provide means to protect parts being controlled from damage from the kinetic energy developed in the system during operation.

Another object of the invention is to provide means for shunting the kinetic energy around the more delicate electromagnetic parts when the armature reaches closed position.

Another object is to reduce the impact of the armature and pole piece by providing a receding pole piece, and at the same time to bypass the kinetic energy around the meeting surfaces of the armature and pole piece.

Another object is to provide means compensating for the excess forces resulting from solenoids of excess rating.

Another object is to provide means for fitting the load pull curve to the solenoid pull curve to provide a more efficient and better balanced system.

Other objects will be clear from the following description of various embodiments of the invention illustrated in the accompanying drawings.

In the drawings:

Fig. 7 is a top plan view, with parts broken away and sectioned, of a push type solenoid embodying the invention;

Fig. 8 is a side elevation of the solenoid of Fig. 7 showing parts in section;

Fig. 9 is an end elevation of a small lever solenoid embodying the invention and showing parts in section;

Fig. 10 is a side elevation of the solenoid of Fig. 9;

Fig. 11 is a top plan view, with parts broken away and sectioned, of a solenoid utilizing a receding frame;

Fig. 12 is a side elevation of the solenoid of Fig. 11 showing parts in section;

Fig. 13 is a side elevation of a direct current solenoid with parts broken away;

Fig. 14 is a side elevation of a solenoid system showing the abutment applied to the parts being operated and means allowing the latter to recede; and Fig. 15 is a schematic drawing showing a system employing two sets of abutments to relieve the mechanical joints of wear.

In carrying out the invention in one of its phases the pole piece is mounted to recede under the impact of the armature and a fixed stop is provided to be engaged by a projection or part on the armature to shunt the major portion of the kinetic energy of the armature and its attached parts from the pole piece.

In another phase cooperating abutments are disposed in the system and serve to dissipate the kinetic energy of the several parts, by directly stopping the movement of those parts containing the major portion of the kinetic energy.

In carrying out the present invention in another phase the excess force exerted by a solenoid of excess rating is counteracted by a spring or other means opposing such force.

In another phase springs are employed to compensate for inappropriate load curves of the system.

Figure 1:
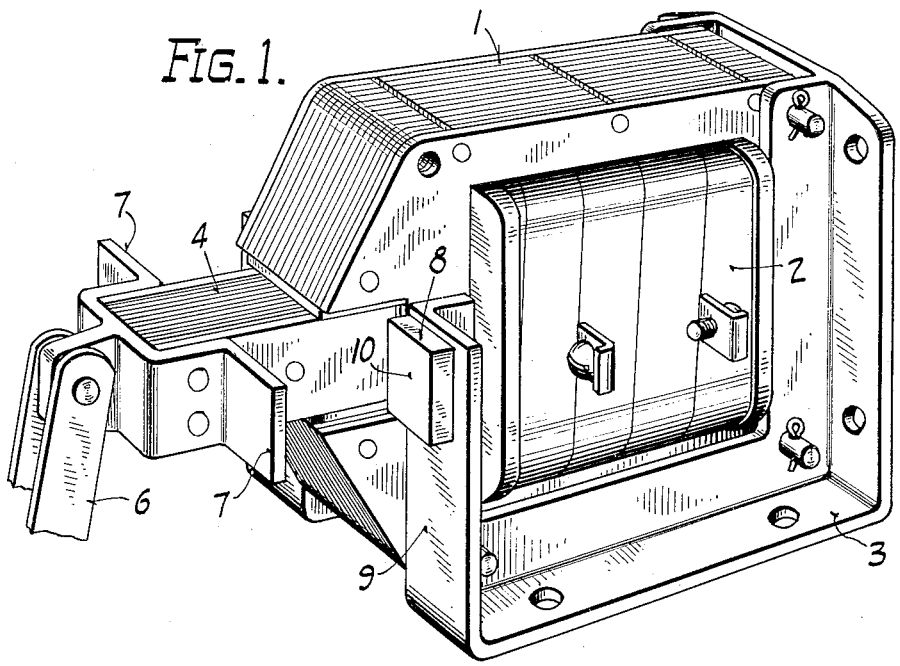
Figure 1 is a perspective view of a preferred form of pull solenoid.

The solenoid illustrated in Figure 1 has a laminated magnet frame 1 encircling a coil or winding 2 in an axial plane of the coil. The frame 1 is fixed to a base 3 for stationary support.

Figure 3:
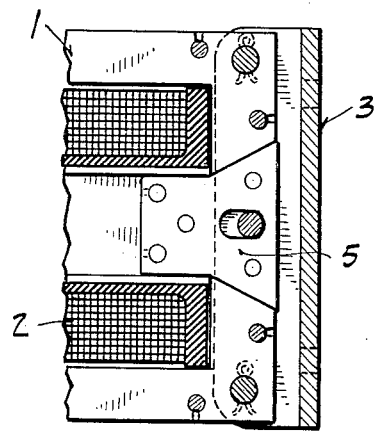
Fig. 3 is a detail longitudinal section showing the receding pole piece of the solenoids of Figures 1 and 2.

The armature of the solenoid comprises a laminated core 4 forming a plunger extending and movable axially of the winding and through an opening in one end of the frame. A freely receding pole piece 5, shown in Figure 3, is mounted in an opening in the opposite end of the frame to contact with the plunger when the latter strikes home to close the magnetic circuit on its working stroke.

The outer end of the armature is normally secured to a lever arm 6 or other mechanism to be operated by the solenoid.

In carrying out the invention an abutment or projecting flange 7 is provided on opposite sides of the armature to engage corresponding abutments 8 on an extension or leg 9 of the base 3. The abutments 8 have preferably a face 10 of material adapted to withstand repeated severe impact and to absorb large amounts of energy therefrom. The relative location of the abutments 7 and 8 is such as to effect their engagement immediately after the plunger 4 engages the pole piece 5. The abutments serve to positively stop the movement of the plunger and all parts moving therewith.

Figure 2:
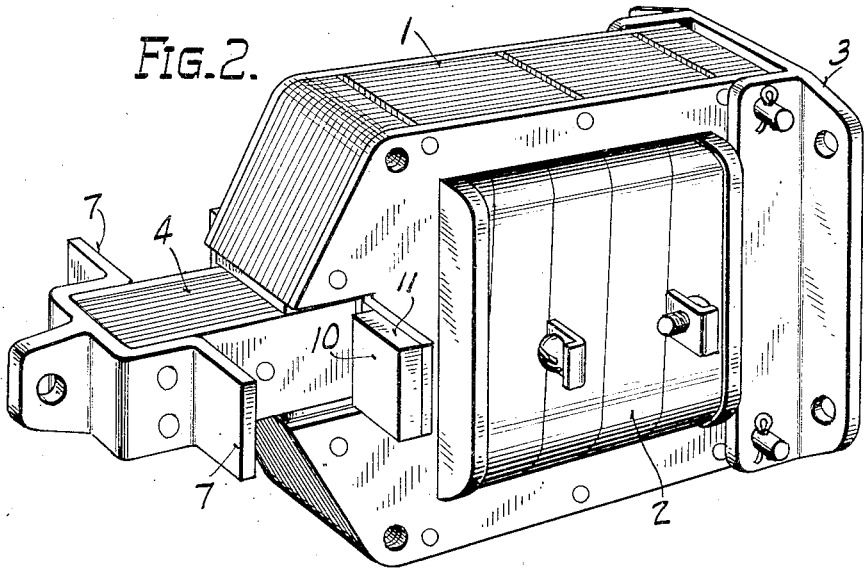
Fig. 2 is a similar view of a solenoid showing a modified form of abutment.

In Figure 2 a lighter solenoid is constructed substantially the same as that in Figure 1 except that the abutment 11, corresponding to abutment 8 in Figure 1 is mounted on the side plate of the frame 1 instead of upon the base 3. The extension 9 is thereby eliminated.

Figure 4:
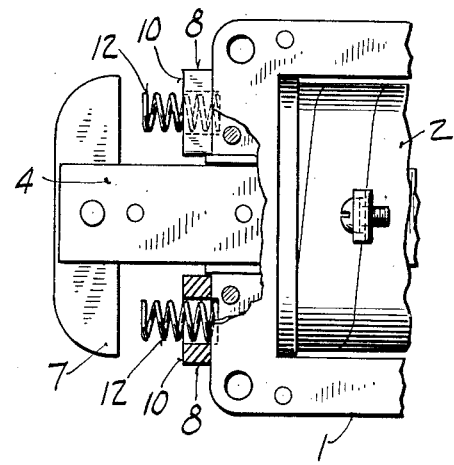
Fig. 4 is a detail view showing a modified type of abutment for the solenoids of Figures 1, 2, 7 and 8, and in which springs are employed to compensate for improper load conditions and also for the use of solenoids of higher ratings than required.

In Figure 4 is illustrated a modified form of abutment in which a coil spring 12 is mounted in a hole through the center of face 10. The spring 12 may of course be placed elsewhere in the system.

Figure 5:
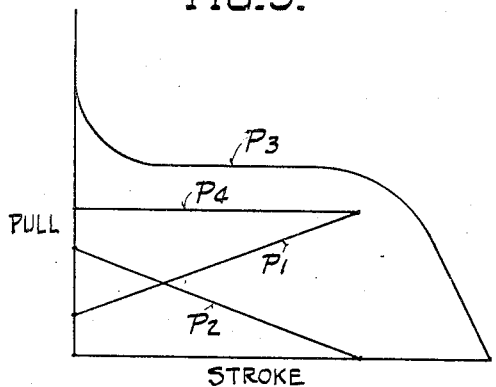
Fig. 5 is a chart illustrating the pull and load curves of a solenoid system embodying the invention.

Referring to Figure 5, the ordinates of the chart represent the pull and the position of the plunger respectively. The curve $P_1$ is a typical load curve which is encountered in the disengaging of positive clutches and shows a decreasing load as the plunger moves near to closed position. The curve $P_2$ represents the pull of a compensating spring such as spring 12 placed in the system in accordance with the present invention. The solenoid pull curve is $P_3$. The spring of curve $P_2$ is designed to compensate for the disparity existing between the solenoid pull curve and the load curve. The curve $P_4$ is the summation of the curves $P_1$ and $P_2$ and represents the composite load of the work and of the compensating spring.

By employing a spring of proper design for compensating for excess solenoid strength or for variance between the load curve and the solenoid pull curve, it is possible to provide a composite curve $P_4$ substantially parallel to the pull curve $P_3$ of the armature and providing a more uniform excess force throughout the stroke of the solenoid. However, it must be understood that the compensation of the system as set forth does not provide a remedy for troubles arising from forces which are introduced as factor of safety, for the purpose of accelerating the moving parts, and those which result from the fluctuation in the voltage of the supply system.

Where the solenoid is one of excess rating for the given load, the springs 12 serve as compensating load to prevent the building up of too high a kinetic energy in the moving system and to prevent too high a rate of acceleration. Where the load decreases as the system moves under the influence of the solenoid it is desirable to construct the springs 12 to compensate for such decrease by adding load as the armature moves to closed position. Likewise, with an increasing load, it is possible to employ means to provide a composite load more nearly proportioned to the pull curve of the solenoid.

Figure 6:
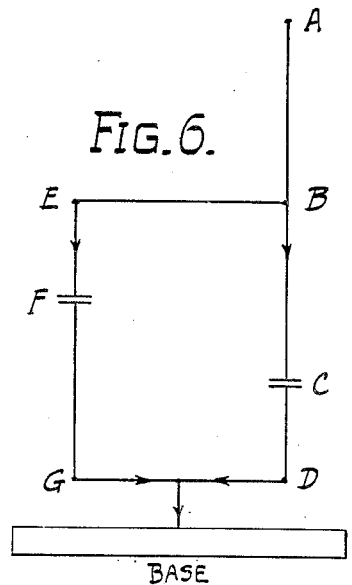
Fig. 6 is a chart showing the dissipation of kinetic energy in the system.

Figure 6 represents the kinetic energy diagram of the invention. In it the line A, B, C represents the total kinetic energy developed in the moving system during a working stroke, part A—B representing the kinetic energy of the system moved by the armature, and part B—C representing the kinetic energy developed by the armature. C is the point of impact of the armature with the pole piece and line C—D represents that part of the kinetic energy that is absorbed by the receding pole piece under the impact.

Line B, E, F, G, represent a shunt for the kinetic energy, F being the point of impact for the shunt, and the line EFG representing the amount of kinetic energy shunted from the contacting surfaces of the armature and pole piece at C. In the chart, line C—D plus line EFG is approximately equal to line A—B plus line B—C. That is, the kinetic energy absorbed by the pole piece plus that shunted therefrom is equal to the kinetic energy of the armature plus that of the parts moving with the armature.

The solenoid is so constructed that the impact at F takes place immediately following that at C, and by providing a freely receding pole piece the kinetic energy absorbed by impact at C is entirely limited to the energy absorbed in accelerating the mass of the pole piece.

The flow of energy is as follows: When the plunger or armature reaches the end of its working stroke it has a certain amount of kinetic energy by reason of the moving mass of the armature and parts moving with it. The magnitude of this energy will depend upon the mass of the plunger and all parts moving with it and the velocity at which such mass is traveling. Upon striking of the plunger against the stationary pole piece, the latter being free to recede, a certain amount of the kinetic energy of the moving system is transferred to the pole piece to accelerate movement of the latter, and the plunger and moving system is decelerated or slowed down by an amount proportional to the transferred kinetic energy. The magnitude of this transferred energy for any given set of conditions will depend upon the mass of the pole piece and may be calculated by the use of the equations representing the laws of impact. By making the pole piece of minimum mass the quantity of kinetic energy transferred by the impact can be limited to an absolute minimum.

After the impact of the armature with the pole piece has taken place at C, the armature is finally stopped in its movement by the impact at F. In this impact the plunger and parts moving with it are completely decelerated and the kinetic energy of the moving system is completely dissipated along the lines BEFG to the base or fixed support of the solenoid which, in accordance with the invention, is appropriately designed to take care of such dissipation. In accordance with this invention the construction of the shunt circuit BEFG is made such that the flow of kinetic energy through it cannot in any way damage the solenoid and the system which it operates, or decrease the efficiency of the solenoid operated system.

Referring to Figures 7 and 8, the solenoid illustrated is of the push type. In it the armature has its two side plates 13 extended rearwardly alongside of the receding pole piece 5' and through slots in the base 3' to provide a header 14 to serve as a pusher. The opposite outer end of the plunger has a head forming abutments 7' to engage the abutments 8' on the end of the frame 1'.

Figures 9 and 10 illustrate a small lever solenoid in which the outer yoke or casing 15 carries abutment faces 16. The solenoid frame 17 is mounted inside and held in place by screws 18 extending through slots in the casing 15 and which allow a receding movement of the frame relative to the casing. The armature 19 has a lever arm 20 pivoted to its outer end in such a manner that upon closing of the plunger with the fixed pole piece 21 of frame 17 the arm 20 engages the abutments 16 and bypasses the kinetic energy away from the magnetic frame and plunger.

Figures 11 and 12 illustrate the push type of solenoid similar to that shown in Figures 7 and 8, except that the abutments 22, which correspond to abutments 8' of the other construction, contain springs 23, corresponding to springs 12, and are mounted on an extension or leg 24 of the base 3'. In this construction, instead of employing a receding pole piece, the entire magnet frame is mounted for recession by reason of the slots 25 in the flanges of the base for receiving the securing pins 26.

In Figure 13 a direct current solenoid is illustrated. This has a cylindrical casing 27 enclosing the winding 28 and flanged at one end for bolting to an end plate 29. The other end of the casing 27 is closed except for a central opening through which the plunger 30 operates. The plate 29 is provided with a receding pole piece 31 operating in a central opening therein. The abutments for arresting the movement of the system are provided by a flange 32 on the plunger 30 and on abutment face 33 on the end of casing 27 encircling the plunger. A spring may also be employed with this type of solenoid with the same advantages as pointed out above when employed with alternating current solenoids.

In all of the constructions illustrated the principal fundamental is to eliminate excessive impact at the contacting surfaces of the plunger and pole piece. This is accomplished by providing for the receding of one member under impact from the other and then positively stopping the moving member by means disposed externally of the magnet and which do not transmit the forces required for stopping the moving member through the contacting surfaces. The major part of the kinetic energy is thereby shunted from the meeting surfaces of the plunger and pole piece.

Apart from the fundamental, another phase of the invention illustrated lies in the use of springs 12 to change the load characteristics of the system and compensate for excess strength in the solenoid and for improper load conditions.

The exact location of the abutments and of the springs may be determined for each type of service in accordance with the requirements. For instance, in some instances the parts to be moved by the solenoid far outweigh the armature and consequently the major portion of kinetic energy developed lies in such parts as distinguished from the armature.

In Fig. 14 the solenoid 34 is disposed with a vertically movable armature 35 from which is suspended a link 36 carrying a heavy weight 37. Closing of the armature is designed to effect lifting of the weight. Since, in operation, the weight 37 will develop a considerably larger amount of kinetic energy than will the armature 35, the abutments 38 and 39 for stopping the moving system are disposed to act directly on the weight. Abutments 38 are on the weight while corresponding abutments 39 are located on a depending U shaped casing member 40 secured to the fixed support 41 to which the solenoid is attached. By placing the abutments as described the kinetic energy of the weight is not transferred through the joints of the link to the armature and both the solenoid and the link pivots are free from shock.

Where the abutments are located to directly stop the parts being operated by the solenoid, it is possible to eliminate the receding pole piece or frame by providing a link pivot joint having its pivot pin 42 slidable in slots 43 in one of the joint members. In this way when the armature 35 strikes the fixed pole piece or frame of the solenoid, it gives up only the kinetic energy of the armature mass. The kinetic energy of the weight continues in the weight by reason of its continued movement until the abutments 38 and 39 come into contact and dissipate the energy. Such a loose joint connection for the link or lever mechanism being operated can be located wherever convenient and serves to limit the kinetic energy dissipated by striking of the armature against the pole piece to that contained in the armature and in such part of the moving system as may be located between the loose joint and the armature.

In Fig. 15 a system is shown of compound levers having a number of pivot mountings and connections. In this instance the solenoid 44 has its armature 45 connected by link 46 to one end of a lever 47. The lever 47 is fulcrumed at the opposite end by pivot 48 and has a link 49 connecting it to the end of a second lever 50 close to a fulcrum point 51 for the latter. The lever 50 constitutes a heavy knife 52 weighing several times the weight of the armature and which swings downwardly to cut material on a cutting block 53.

With this construction an abutment 54 is provided on the end of the knife to engage a fixed abutment or stop 55. By thus directly absorbing the kinetic energy of the knife, the several pivot fulcrums and joints are protected from wear due to impact. In this instance either a receding pole piece, a receding frame or a loose connection may be employed to limit the amount of kinetic energy absorbed by the impact of the armature in striking home. A spring 56 secured to one of the levers (here shown as secured to the end of link 49) holds the mechanism in normal position with the knife raised and also serves to take care of the use of solenoids of excess rating as well as compensating for improper load characteristics.

While the invention has been described as employed on solenoids of various types, it will be understood that the invention is applicable to other reciprocating electromagnetic apparatus and that it may have various embodiments within the scope of the accompanying claims. Reference is made to my co-pending application Serial No. 354,307 filed August 26, 1940, disclosing and claiming a solenoid construction suitable for the application of the present invention. Reference is also made to my co-pending application Serial No. 354,306 filed August 26, 1940, disclosing and claiming a straight line motor employing abutments similar to those provided herein.

I claim:

1. In combination in a power solenoid in which the moving plunger and parts attached thereto contain a large amount of excess kinetic energy upon completion of the useful work of the solenoid, a magnet frame of laminated magnetically permeable material having an energizing coil, a laminated plunger core disposed axially in the coil and extending through an opening in one end of the frame, said frame providing a small gap of substantially constant low reluctance adjacent the plunger core, the inner end of said plunger core being disposed to engage a movable portion of said frame consisting of a central receding pole piece disposed in an opening in the opposite end of the magnet frame at the end of the useful working stroke of the plunger core, said pole piece and the frame at the pole piece opening having large complementary inwardly slanting surfaces located and shaped to provide intimate engagement between said surfaces in wedging relation upon the return of the pole piece after recession from impact from the plunger core and thereby providing a magnetic flux path of very low reluctance between the frame and pole piece inclosed position and at the same time preventing loss of the holding power of the solenoid, and relatively rigid stop means separate from and in addition to the pole piece and any load operated by the solenoid plunger for dissipating the balance of the kinetic energy from the moving parts at the completion of the uesful work and operative after impact of the plunger core with said pole piece to shunt the excess kinetic energy from the impact surfaces of the magnetic core and pole piece members in a path parallel to such impact surfaces and to the load.

2. A power solenoid comprising a magnet frame having a centrally disposed magnetizing coil with an axial opening for receiving a plunger, said frame having an opening in one end in alignment with the axial opening in said coil and of a size closely fitting said plunger with a minimum of reluctance at the gap therebetween, a magnet plunger disposed for axial movement through the opening in said frame and into the opening in said coil, means at one end of said plunger for connecting it to a load tending to force it out of the coil, said frame having an opening in its end opposite the plunger and in axial alignment with the axial opening in the coil, a movable pole piece disposed in said opening to transmit flux between the rear end of the frame and the inner end of the plunger and to freely recede under impact from said plunger when the latter is pulled inwardly by energization from said coil, and a substantially rigid stop independent of the pole piece and of any load operated by the plunger and external to the parts constituting the electromagnetic circuit of the solenoid for arresting the movement of the plunger and attached parts after impact of the plunger with the pole piece, said pole piece and the frame at the pole piece opening having large complementary inwardly slanting surfaces located and shaped to provide intimate engagement between said surfaces by a wedging action in normal holding position of the solenoid upon return of the pole piece inwardly after receding under impact from the plunger, and said stop providing a shunt path for the dissipation of a substantial portion of the kinetic energy of the moving parts parallel to the path across the impacting surfaces of the plunger and pole piece and independently of the working load.

PANFILO TROMBETTA.